July 17, 1951     A. W. THOMAS, JR., ET AL     2,561,155
MAGNETIC BOBBIN HOLDING MEANS
Filed Feb. 18, 1950     4 Sheets-Sheet 1
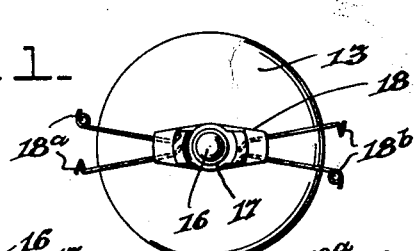
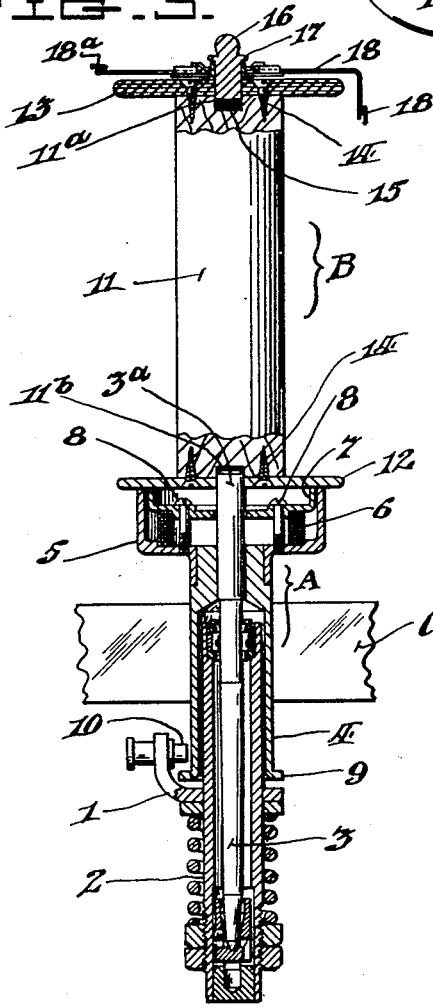
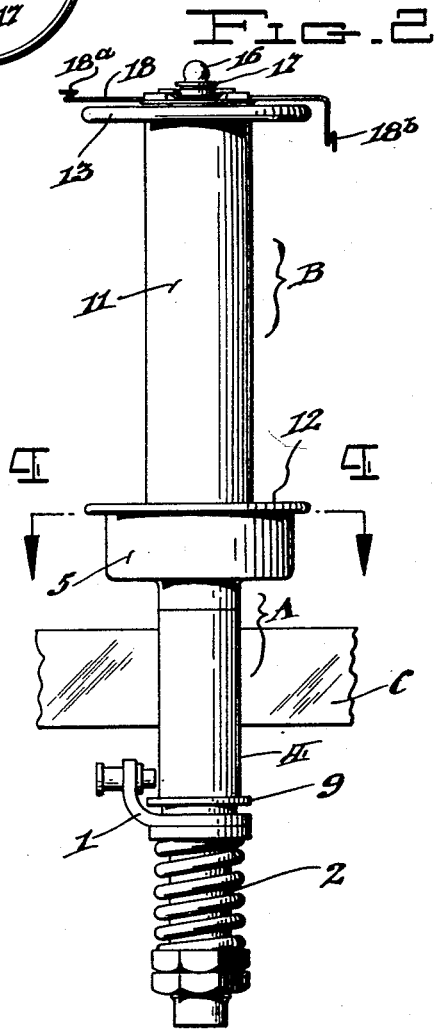
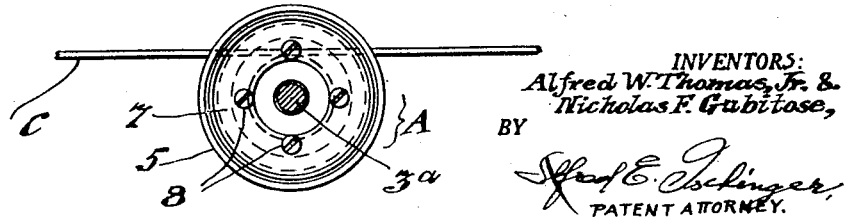
INVENTORS:
Alfred W. Thomas, Jr. &
Nicholas F. Gubitose,
BY
PATENT ATTORNEY.

July 17, 1951 A. W. THOMAS, JR., ET AL 2,561,155
MAGNETIC BOBBIN HOLDING MEANS
Filed Feb. 18, 1950 4 Sheets-Sheet 2
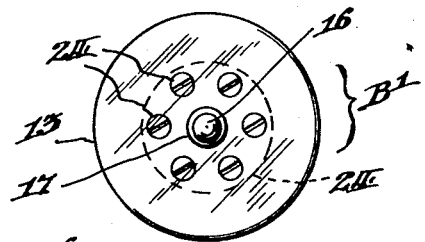
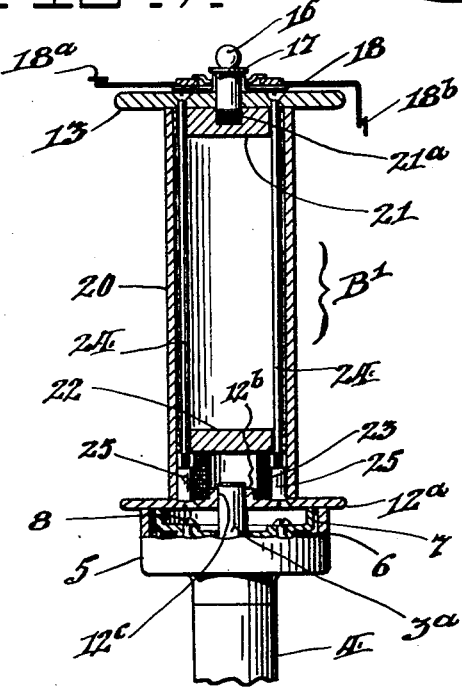
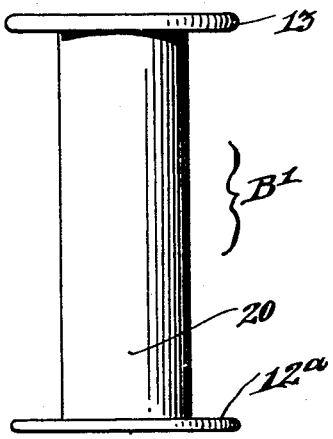
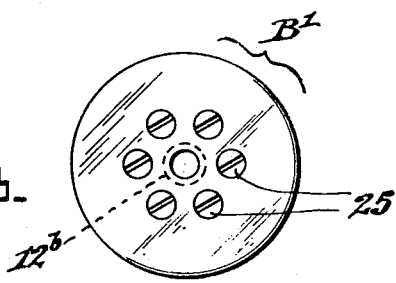
INVENTORS:
Alfred W. Thomas, Jr. &
Nicholas F. Gabitose,
BY
Alfred E. Ischinger
PATENT ATTORNEY.

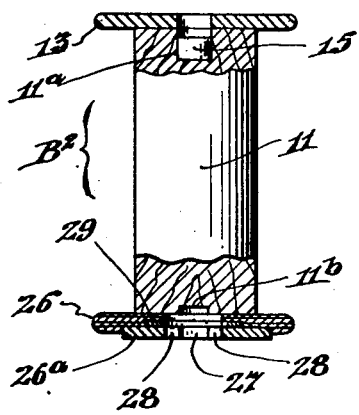
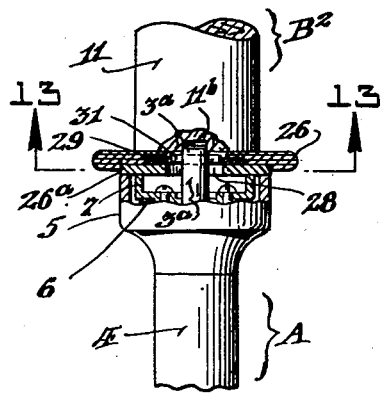
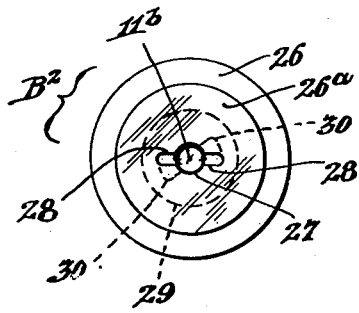
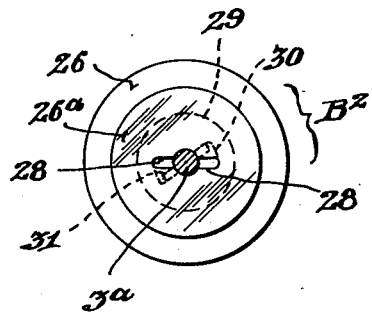
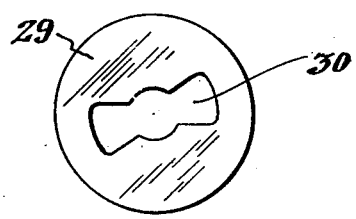

July 17, 1951  A. W. THOMAS, JR., ET AL  2,561,155
MAGNETIC BOBBIN HOLDING MEANS
Filed Feb. 18, 1950  4 Sheets—Sheet 4

INVENTORS:
Alfred W. Thomas, Jr. &
Nicholas F. Gubitose,
BY
Alfred E. Lockinger
PATENT ATTORNEY.

Patented July 17, 1951

2,561,155

UNITED STATES PATENT OFFICE 2,561,155

MAGNETIC BOBBIN HOLDING MEANS

Alfred W. Thomas, Jr., Clarks Summit, and Nicholas F. Gubitose, Scranton, Pa., assignors to U. S. Textile Machine Company, Scranton, Pa., a corporation of Pennsylvania Application February 18, 1950, Serial No. 144,876

3 Claims. (Cl. 242—46.2)

1

This invention relates to the yarn package, spool, or bobbin mounting and operating units of standard textile machines.

Standard yarn winding and twisting machines of the indicated type, usually comprise a long frame structure along both sides of which are mounted, in superimposed relationship, multiple rows of similar yarn winding and twisting units. The rows of units along one side of the machine are arranged back-to-back relative to the rows of units along the other side of the machine. Each of the individual units comprises a vertically positioned yarn package, or loaded spool, or bobbin, which is mounted on and rotated by a twister spindle. In operation, the yarn is drawn up or down from the yarn package and wound onto a horizontally positioned take-up roll, or bobbin, that derives its rotational movement by direct frictional contact with a revolving driving drum.

The vertically positioned yarn packages, spools, or bobbins, are provided with a centrally, axially, or longitudinally extending bore, or aperture, adapted to permit mounting of the spools on the blades of the individual twister spindles in such manner as to effect frictional connection therewith. Each of the spindles is united with, and projects upwardly from, a whorl, and the respective whorls may be selectively, or collectively rotated, by bringing them into frictional contact with a common flat driving belt, as desired. The said spindle and whorl arrangements consequently form a rotatable mounting means for said yarn packages, spools, or bobbins.

It has been found in practice that this type of bobbin mounting and operating unit is unsatisfactory from a practical standpoint because it is subject to various difficulties and detrimental results. For example, the relatively long spindles, or spindle blades, which extend centrally through the yarn packages, or bobbins, become bent, to a greater or lesser degree, in connection with the mounting and dismounting of the bobbins, or the spindle blades are bent when the yarn packages mounted thereon become loose, so that the rotational forces acting on the spindle blade become unbalanced during the high speed yarn unwinding operation. This causes excessive bobbin vibration, spindle wear, and prevents perfect holding of the bobbin on its true center of rotation. Since the bobbins are usually formed of wood so that the spindle blade bearings of the bobbin are relatively soft, the said bearings also become unbalanced by wear and must be reamed larger for better fit on the spindle blade. This

2 usually changes the original bobbin and blade alignment, or changes the original true axial relationship of the spindle hole and bobbin barrel. Then too, it has been found that when nylon yarn, or other modern yarns having an elastic quality, are wound on bobbins that are hollow, or have a hole extending axially through the center thereof, the yarn mass wound thereon exerts a contracting, crushing, or distorting force on the bobbin wall to such an extent as to distort, damage, ruin, or otherwise detrimentally affect the bobbin structure, or unbalance the spindle blade bearings thereof.

One object of our invention is to provide a novel bobbin mounting and operating unit of the general type indicated, which overcomes the mentioned and other structural and operating difficulties in a simple and effective manner.

Another object is to provide such a unit which embodies novel structural and functional features of advantages over the similar units of the prior art.

An additional object is to provide such a unit which eliminates the general repair costs and problems associated with rotatable spindle blade bobbin mountings.

Another object is to provide such a unit in which the bobbin and rotatable mounting are connected for rotation in fixed precisely aligned relation by magnetic means.

It is also an object to provide such a unit having simple safety latch means for effecting positive mechanical connection of the bobbin and rotatable mounting by relative turning movement thereof after being magnetically connected, so as to prevent any possibility of the bobbin "flying off," or becoming separated from the mounting, in the event that the magnetic connecting means should fail during operation of the machine.

A further feature resides in the provision of a novel bobbin structure having a solid yarn receiving section, or barrel, that is free of the detrimental, or damaging effects, usually caused by the winding and unwinding of nylon, or other type elastic yarn, on the similar hollow, or apertured section, of a prior art bobbin.

Another object is to provide such a bobbin having novel magnetic means arranged at one end thereof to facilitate the mounting thereon and removal therefrom, of a usual type yarn guide spinner.

Another object is to provide such a bobbin having an aligning recess at one end thereof adapted to cooperate with a complementary aligning element projecting from the rotatable bobbin mounting.

A further object is to provide such a bobbin having a ferrous metal flange at one end thereof, or a flange with a ferrous metal insert, an outer surface portion of which flange is adapted to be seated on the rotatable mounting and magnetically connected therewith in such manner that the longitudinal axis of the bobbin and the longitudinal axis of the mounting are maintained in precise alignment with each other at all times.

Another unique feature of the invention resides in the provision of a novel bobbin mounting and operating unit which includes a rotatively operative whorl having a permanent magnet, or an electromagnet, mounted therein, so as to effect magnetic connection of a certain type bobbin with the whorl when the bobbin is seated on the latter.

Another object is to provide such a unit in which the bobbin and rotatable mounting are connected in such manner that the bobbin load is distributed about the center of the bobbin mass in more precise manner than theretofore, so as to reduce the bobbin vibration to a minimum, and in order that the bobbin operating power may also be maintained at a minimum when the bobbin and mounting are rotating at full speed.

With these and other objects in view, which will become more apparent from the following detailed description of the various practical and illustrative embodiments of our improvements shown in the accompanying drawings, the invention comprises the novel bobbin and operating means therefor, elements, features of construction and arrangement of parts in cooperative relationship, as more particularly defined by the hereto appended claims.

In the accompanying drawings:

Figure 1 is a top plan view of one form of device embodying our invention.

Fig. 2 is a side elevational view of the device shown in Fig. 1.

Fig. 3 is a view, similar to Fig. 2, but shows certain parts in section so as to disclose the constructional details thereof.

Fig. 4 is a plan sectional view, taken substantially as indicated by the arrows 4—4 on Fig. 2.

Fig. 5 is a top plan view of a modified form of bobbin device, constructed in accordance with our invention.

Fig. 6 is a side elevational view of the bobbin device shown in Fig. 5.

Fig. 7 is a central vertical sectional view through the bobbin device shown in Figs. 5 and 6, with certain parts added thereto.

Fig. 8 is a bottom plan view of the bobbin device shown in Fig. 6.

Fig. 9 is a side elevational view of another form of bobbin device, constructed in accordance with our invention, certain parts being broken away and in section.

Fig. 10 is a bottom plan view of the bobbin device shown in Fig. 9.

Fig. 11 is an enlarged face view of a certain latch plate element embodied in the bottom flange of the bobbin device shown in Figs. 9 and 10.

Fig. 12 is a partial elevational sectional view through the bobbin device shown in Figs. 9 and 10, as it appears when in connected relation with a certain rotatable mounting therefor.

Fig. 13 is a horizontal sectional view, taken substantially as indicated by the arrows 13—13 in Fig. 12.

Figure 14:
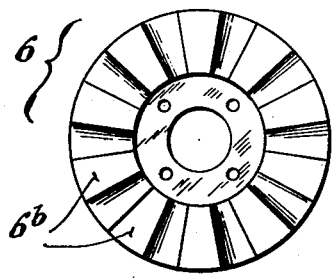
Fig. 14 is a top plan view of a permanent magnet, such as embodied in the rotatable bobbin mounting means disclosed in Figs. 2, 3, 7 and 12.

Referring now more particularly to the form of our invention disclosed by Figs. 1 to 4 inclusive, the device there shown comprises, a rotatable bobbin mounting generally indicated by the letter A; a spool, or bobbin, generally indicated by the leter B; and means for rotating said bobbin mounting, generally indicated by the letter C.

The parts A, B and C are adapted to be embodied for operation in a standard, or conventional, textile yarn winding and twisting machine of the "up-twister" and down twister type. The part indicated by the letter C, represents a well-known flat, endless driving belt of such a machine, which is arranged to impart high speed rotary motion to the respective bobbin mountings B, of the individual yarn winding and twisting units of the machine, when the belt C and bobbin mountings B are brought into frictional contact, or connection with each other, in accordance with the usual practice followed when operating such machines.

The rotatable bobbin mounting A of our invention is similar, in certain respects, to the prior art mountings of this type in that it comprises a fixed support, or base 1, which stationarily carries a bolster 2, having centrally mounted therein for free rotation a spindle 3, to the upper end of which is fixedly secured a spindle whorl 4, arranged to be rotated by frictional connection with the driving belt C, as previously indicated.

In the similar rotatable prior art bobbin mountings, the spindle extends upwardly for a considerable distance, beyond the whorl, and this extended spindle section is gradually tapered, as illustrated, for example, in U. S. Schaum Patent No. 1,951,847, issued March 20, 1934. The prior art spools, or bobbins, are provided with an axially, or lengthwise centrally arranged bore, or hole, so that the bobbins can be mounted on the said spindle extension, or section, by lengthwise sliding movement of the bobbin unto the said spindle section, in such manner that the outer surface of the latter will frictionally engage the internal bore wall of the bobbin, as indicated by the drawing of said patent.

Contrary to this prior art arrangement, the upper end of the spindle 3 of our invention, extends only a very short distance beyond the whorl 4, and forms a bobbin aligning element, or stud 3ᵃ. A shell, or casing 5, of soft steel or the like, is attached by a press fit connection with the upper end of the whorl 4, and a permanent magnet 6, of ring-like configuration is mounted within the casing 5, in surrounding relation to the stud 3ᵃ. The magnet 6 is secured in place by an inner cup-shaped member 7, that is also formed of soft steel or the like, and is held in pressure contact with the upper surface of magnet ring 6, by four screws 8, secured in threaded apertures formed in the casing 5, as clearly shown in Fig. 3.

The lower end of the whorl 4 is provided with a laterally extending annular flange 9, and a hand manipulated spring pressed plunger 10 cooperates with the latter, in usual manner, as a latch means for retaining the whorl 4 on the bolster 2. By laterally withdrawing the plunger 10 beyond the edge of the flange 9, the whorl 4 will be freed for removal from the bolster 2.

In order that the spindle 3 may rotate freely within the bolster 2, the latter may be provided with suitable spindle bearings, and otherwise designed, or formed in accordance with the prior art practice, as taught for example by said U. S. Schaum Patent No. 1,951,847, or by U. S. Bowker Patent No. 1,868,688, issued July 26, 1932.

The spool or bobbin B, has a central solid yarn receiving section, or barrel 11, that is formed of wood, plastic material, fibrous material, or the like, and the outer yarn receiving surface thereof is made smooth, as usual. The opposite ends of the barrel 11 are each provided with a central recess 11a and 11b, and a circular flange element 12, of ferrous metal, such as hardened steel, is secured to one end of the barrel 11, while a circular flange element 13, of wood, plastic material, fibrous material, etc., is secured to the other, or upper end of the barrel 11. The flange elements 12 and 13 are each secured to the barrel 11 by a balanced series of brass screws 14 the heads of which are countersunk, and each of said flange elements 12 and 13 is provided with a central circular aperture, of the same diameter as the respective circular barrel recess 11a or 11b, in registry therewith.

The hardened steel flange 12, is provided with smooth polished surfaces and is centered on the end of the barrel 11 with a close tolerance. The steel flange 12 is subject to magnetic attraction, and the bobbin B is, therefore, magnetically connected with the top of the whorl 4, when seated thereon as shown in Figs. 2 and 3. When so seated, the outer smooth surface of the steel flange 12 is in contact with the upper free edges of the inner and outer cup-shaped whorl members 5 and 7 that are accurately machined to provide precisely centered seating of the bobbin B relative to the whorl 4 and spindle stud 3a, and held on said edges by the magnetic attracting force of the ring magnet 6. The latter is so designed that the magnetic force thereof is of sufficient magnitude to maintain the yarn loaded bobbin B in magnetically connective relation on top of the whorl 4 during high speed rotation of the latter by the driving means, or belt C.

Frictionally mounted in the inner end of the recess 11a is a small, permanent, disc-shaped magnet 15, adapted to attract and hold in position a ferrous metal plug, stud, or pin-shaped bearing element 16, provided with an annular flange 17. The bearing element 16 is arranged to form a pivot means for a standard, or conventional, yarn guide spinner 18, provided with yarn guide elements 18a and 18b, and adapted to freely rotate on the bearing element 16, below the retaining flange 17 thereof. The spinner 18 can be quickly and easily mounted on, or dismounted from, the upper end of the bobbin B, by simply removing and replacing for this purpose the bearing element 16, which is held in magnetically connected relation with the bobbin B by the magnet 15.

When the described novel bobbin B, and rotatable mounting means A therefor of our invention, are utilized in a standard yarn winding and twisting machine of the type indicated, our improvements provide several important structural and functional features of advantage over the above referred to similar devices of the prior art, in which a bobbin is frictionally mounted on a long spindle blade that passes through a hole in the center of the bobbin. In the first place, with our novel arrangement the spindle blade problems and difficulties of the said prior art devices are completely eliminated. Then too, with our arrangement the mass of the yarn wound on the bobbin B is centered on the steel flange 12 that is precisely seated on the whorl 4, so that there is nothing to throw the yarn package out of balance. Furthermore, since the bobbin B is held in precisely seated position on the whorl 4, by the magnet 6, the load is better distributed about the center of the aligning, or centering stud 3a, so that vibration is reduced to a minimum and less power is required to drive the yarn package when the bobbin is rotated at full speed. Also, the steel bobbin head, or flange 12, being hardened, prevents wear and avoids bent, or otherwise damaged edges. Since the bobbin barrel 11 is solid, it cannot be crushed, distorted, or otherwise detrimentally affected, by the winding and unwinding thereon of nylon, or other type elastic yarns. In addition, the magnetically connected spinner bearing at the top end of the bobbin B, not only greatly facilitates the mounting and dismounting of a yarn guide spinner, as desired, but also makes it possible to provide the same type and size bearing arrangement for the spinners 18 on all bobbins.

The bobbin and rotatable mounting means of our invention may be modified as indicated by Figs. 5 to 11 inclusive of the drawings.

The form of bobbin B$^1$ shown in Figs. 5 to 8 inclusive, embodies certain parts which are similar to those of the bobbin and rotatable mounting arrangement shown in Figs. 1 to 4 inclusive. To avoid redundancy of the description of these similar parts, the same reference characters are applied thereto in Figs. 5 to 8.

The bobbin B$^1$ differs from the bobbin B shown in Figs. 1 to 4, in that a cylindrical yarn receiving part 20 is provided, the interior end sections of which have press fit insert pieces, or plug elements 21 and 22, mounted therein, as shown in Fig. 7. The cylindrical part 20 is formed of metal, plastic, or other type material of sufficient strength to prevent nylon or other types of elastic yarn wound thereon from crushing, distorting, or otherwise damaging the same. The insert pieces 21 and 22 are formed of wood, plastic, fibrous, or other type material not affected by a magnet, and the insert piece 21 is provided with a central recess 21a, similar to the recess 11a in the bobbin barrel 11 shown in Fig. 3. A hardened steel head, or flange 12a is secured to one end of the cylindrical part 20, having a centrally located internal annular boss 12b provided with a circular axial aligning aperture 12c. The flanges 12a and 13 are secured to the ends of the cylindrical yarn receiving part 20 by a balanced series of long shank screws 24 and internally threaded screw head type nuts 25.

A permanent ring-type magnet 23 is fixed in position between the flange 12a and insert element 22, the magnetic force of which acts through the steel flange 12a to increase the magnetic holding force which maintains the bobbin B$^1$ seated on the upper edge of the shell, or casing 5, of the whorl 4, and the upper edge of the inner cup-shaped member 7. It will be understood that the polarity of the magnet 23 is reversed to the polarity of the permanent magnet 6 mounted in the casing 5, so as to cause attraction of the bobbin and whorl parts through which the connecting magnetic force of both magnets flows, or acts. This is in accordance with the well known principle that opposite poles of magnets attract each other.

If desired, the magnet 23 of the bobbin $B^1$ may be of such order, size, or strength, that it will function to maintain the bobbin flange $12^a$ seated on the upper end of the whorl 4, during high speed rotary movement of the bobbin $B^1$, and without the aid of the magnet 6 which is mounted in the whorl casing 5, in which case the magnet 6 may be eliminated from the arrangement and the upper end of the casing 5 closed with a ferrous metal disc or the like.

The modified bobbin $B^2$ and rotatable mounting means therefor, shown in Figs. 9 to 11 inclusive embodies certain parts that are like those of the arrangement disclosed in Figs. 1 to 4 inclusive. These similar parts are consequently identified by the same reference characters in Figs. 9 to 11, as used in Figs. 1 to 4, to avoid redundancy of descriptive matter.

The bobbin $B^2$ differs from the bobbin B in that it is provided with a flange 26 which is mainly constructed of a non-ferrous material, such as Bakelite, laminated or other type fibrous material, etc., having fixedly embedded in its lower, or outer surface portion, a disc $26^a$ of ferrous metal, provided with a central aperture 27 from which extend radial slots 28. Integrally formed on the inner, or top section of the disc 26, or fixedly connected therewith, is a disc-like member 29, provided with a keyhole-like aperture 30.

The aligning spindle stud portion $3^a$ of the rotatable bobbin mounting means A, has laterally extending therethrough a fixed pin 31 of such size that the ends thereof which project from the stud $3^a$, will pass through the radial slots 28, when the bobbin $B^2$ is moved into seating relation with the rotatable mounting means A, as shown in Fig. 12. After the pin 31 has passed through the slots 28, it may be freely moved along the back, or inner surface of the metal insert disc 26, to an extent permitted by the confines of the aperture 30, in the disc member 29, when the bobbin $B^2$ and spindle 3 are rotated relative to each other. After the bobbin $B^2$ has been seated on the rotatable mounting A, as shown in Fig. 12, and the former magnetically connected with the latter, as described in connection with the disclosure of the arrangement illustrated by Figs. 1 to 4 inclusive, the bobbin $B^2$ can be positively locked, or latched, to the mounting A, by a partial rotary movement of the bobbin $B^2$ relative to the spindle 3, to an extent effecting movement of the projecting ends of the pin 31, as shown in Fig. 13, so that the said pin ends are adjacent the inner or upper surface of the metallic disc 26. In other words, the pin 31 and cooperating parts, function as a positive latching, or safety lock means, for preventing the bobbin $B^2$ from "flying-off" the rotatable mounting A, in the event that the magnetic connection established therebetween, should fail during high speed rotation of these parts.

To unlock, or unlatch the bobbin $B^2$, from the rotatable mounting means, it is merely necessary to partly rotate the bobbin $B^2$ relative to the spindle 3, so as to bring the ends of the pin 31 in registry, or alignment with the slots 28 in the metal disc $26^a$. The bobbin $B^2$ can then be pulled upwardly, or away from the mounting A, against the action of the magnetic connecting force which normally holds these parts together.

Figure 15:
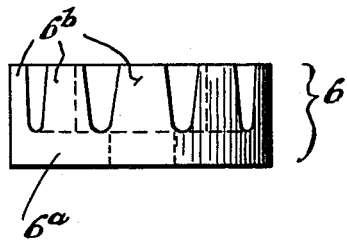
Fig. 15 is a side elevational view of the magnet shown in Fig. 14.

Any type of good grade permanent ring magnet 6, of proper size, may be mounted as shown in Figs. 3, 7 and 12, between the cup-shaped members 5 and 7. Such a magnet may have a plain ring shape as indicated in said figures. However, a preferred permanent ring-type magnet 6 of this type is illustrated more particularly on an enlarged scale by Figs. 14 and 15. Such a magnet is formed of a high grade magnetism retaining metal and comprises a solid lower ring section $6^a$, from which extend an integral series of uniformly spaced projections $6^b$. When such a device has been properly magnetized, the magnetic lines of force emanate from the upper ends of the projections $6^b$ and attract the described ferrous metal bobbin flange, or the ferrous metal insert thereof, as the case may be, of the bobbins $B^1$ and $B^2$ described.

Figure 16:
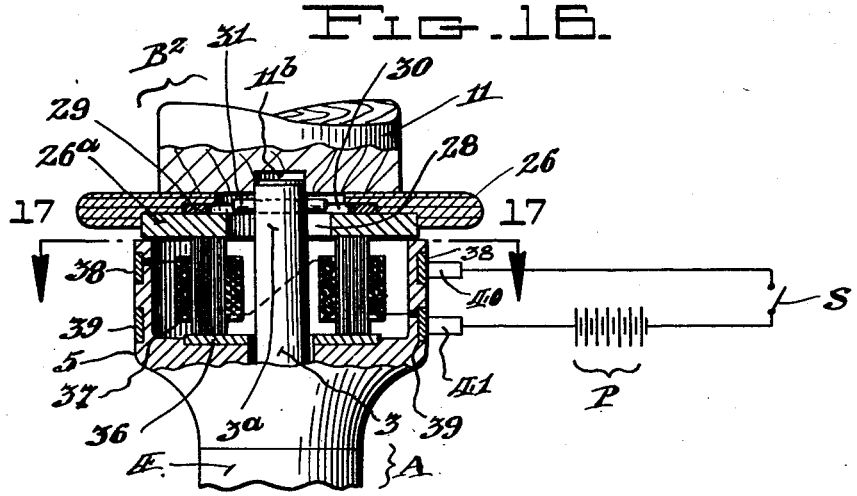
Fig. 16 is an enlarged partial vertical sectional view, similar to Fig. 12, but disclosing an electromagnet in the rotatable bobbin mounting means.
Figure 17:
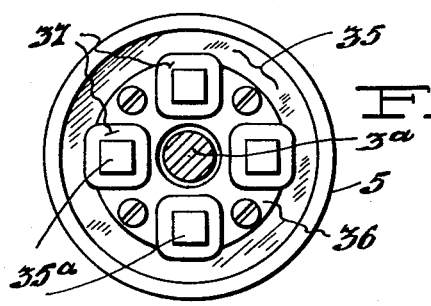
Fig. 17 is a horizontal sectional view, taken substantially as indicated by the arrows 17—17 in Fig. 16.

Figs. 16 and 17 illustrate an embodiment of our invention in which an electromagnet 35 is mounted in the whorl casing 5, instead of a permanent magnet. The bobbin and rotatable mounting parts shown in Figs. 16 and 17, which are similar to parts of our improvements already described, are identified by corresponding reference characters, to avoid repetition of descriptive matter.

The electromagnet 35 is provided in circular form, as shown, and constructed in accordance with the usual and well-known practice. The said electromagnet 35 preferably includes a uniformly spaced circularly arranged series of component electromagnetic members $35^a$, each of which has a usual laminated, or other type core, made of a good grade of ferrous metal. The lower ends of the cores are integrally formed with, or fixedly secured to a common ferrous metal base 36, and an insulated copper wire coil 37 is arranged in surrounding relation with each core. The wire coils 37 are connected in series with each other and the ends of the wire of the entire series of coils are, respectively, connected to metallic bands, or rings 38 and 39, fixedly embedded in the outer surface of the casing 5, which in this instance is made of non-metallic material, such as a good grade of plastic material, or the like. Stationary brushes 40 and 41 have their ends arranged in contacting relation with the metallic rings 38 and 39, and said brushes are connected with a source of electric power P, through a switch S, as diagrammatically indicated in Fig. 16. When the switch S is closed and the bobbin $B^2$ and mounting A are rotated in unison, as heretofore described, the electromagnet 35 will be energized and maintain the bobbin $B^2$ in magnetic connection with the mounting A.

Since electromagnets can be constructed which are substantially more powerful than permanent magnets, it will be realized that when larger and heavier bobbins, or yarn packages, are to be magnetically connected to the rotatable mounting A of our invention, it may be desirable, or advisable, to embody an electromagnet in the latter. It will also be understood that the switch-controlled electromagnet 35 provides other advantages over the permanent magnet arrangement, in that the said electromagnet may, for example, be utilized in combination with standard automatic, or remote control means, to effect various desirable results, in the manner and for the purpose that such equipment is utilized in the electrical field.

Of course, the improvements specifically shown and described, can be changed and modified in various ways, without departing from the invention herein disclosed, the scope of which is in or particularly indicated by the hereto appended claims.

We claim:

1. A bobbin having a recess centrally located at one end thereof, a permanent magnet secured in said recess, a bearing device projectingly held in said recess by the magnet, and a yarn guide spinner mounted for free rotation on the projecting section of said bearing device.

2. A bobbin having a recess centrally located at one end thereof, a permanent magnet secured in said recess, a bearing device projectingly held in said recess by the magnet, a yarn guide spinner mounted for free rotation on the projecting section of said bearing device, a flat surface section at the other end of said bobbin provided with a central recess and means subject to magnetic attraction.

3. A bobbin comprising, a substantially solid yarn receiving barrel, a flanged section at each end of said barrel each provided with a central recess, a metallic element embedded in the surface portion of one of said recessed flange sections which element is subject to magnetic attraction, and a permanent magnet secured in the recess of the other flanged section.

ALFRED W. THOMAS, JR.
NICHOLAS F. GUBITOSE.

REFERENCES CITED

The following references are of record in the file of this patent:

UNITED STATES PATENTS

| Number | Name | Date |
|---|---|---|
| 1,236,965 | Miller | Aug. 14, 1917 |
| 1,592,784 | Smith | July 13, 1926 |
| 2,482,428 | Miller | Sept. 20, 1949 |
| 2,487,837 | Uhlig | Nov. 15, 1949 |

FOREIGN PATENTS

| Number | Country | Date |
|---|---|---|
| 544,110 | Great Britain | Mar. 27, 1942 |